United States Patent
Crider

(10) Patent No.: US 7,610,805 B2
(45) Date of Patent: Nov. 3, 2009

(54) COMBINATION CAPACITIVE PROXIMITY SENSOR AND ULTRASONIC SENSOR FOR MATERIAL LEVEL MONITORING

(75) Inventor: Brett Crider, Bremen, AL (US)

(73) Assignee: The GSI Group, LLC, Assumption, IL (US)

( * ) Notice: Subject to any disclaimer, the term of this patent is extended or adjusted under 35 U.S.C. 154(b) by 275 days.

(21) Appl. No.: 11/883,110

(22) PCT Filed: Jan. 24, 2006

(86) PCT No.: PCT/US2006/002627

§ 371 (c)(1),
(2), (4) Date: Jul. 24, 2007

(87) PCT Pub. No.: WO2006/081291

PCT Pub. Date: Aug. 3, 2006

(65) Prior Publication Data

US 2008/0148845 A1 Jun. 26, 2008

(51) Int. Cl.
*G01F 23/26* (2006.01)
(52) U.S. Cl. .................................. 73/304 C
(58) Field of Classification Search ............... 340/621; 73/304 C, 291; 324/323, 335
See application file for complete search history.

(56) References Cited

U.S. PATENT DOCUMENTS

| 4,284,951 A | 8/1981 | Dahl et al. |
| 4,901,245 A | 2/1990 | Olson et al. |
| 5,062,298 A * | 11/1991 | Falcoff et al. ............. 73/597 |
| 5,121,632 A | 6/1992 | Keller et al. |
| 5,244,099 A | 9/1993 | Zaltzman et al. |
| 5,840,047 A | 11/1998 | Stedham |
| 5,917,776 A | 6/1999 | Foreman |
| 6,040,079 A | 3/2000 | McMurren |
| 6,173,233 B1 | 1/2001 | Janutka et al. |
| 6,347,552 B1 | 2/2002 | Purpura et al. |
| 6,474,261 B1 | 11/2002 | Turner et al. |
| 6,598,473 B2 | 7/2003 | Atkinson |
| 6,634,228 B2 | 10/2003 | Deserno et al. |
| 6,820,483 B1 | 11/2004 | Beckerman |
| 6,832,516 B1 | 12/2004 | Dam et al. |

* cited by examiner

*Primary Examiner*—Hezron Williams
*Assistant Examiner*—Alex Devito
(74) *Attorney, Agent, or Firm*—Kenneth M. Bush; Gerald M. Walsh; Bush Intellectual Property Law

(57) ABSTRACT

A material level detection sensor (10) having a continuous ultrasonic sensor (12) and a capacitive proximity sensor (13). The capacitive proximity sensor detects the material only when the material is at or within the dead zone (15) of the ultrasonic sensor, at which point it switches the ultrasonic sensor off. The ultrasonic sensor transmits a level detection output signal until it is turned off by the capacitive proximity sensor. The capacitive proximity sensor transmits a level detection output signal only when it detects the material, and it will switch the ultrasonic sensor on when it does not detect the material. The material level detection sensor transmits only a single level detection output signal at any given time, providing an accurate and reliable estimate of material level. The device is particularly useful for measuring inventory and consumption of particulate solids and powders in bins or silos (11).

15 Claims, 3 Drawing Sheets

COMBINATION CAPACITIVE PROXIMITY SENSOR AND ULTRASONIC SENSOR FOR MATERIAL LEVEL MONITORING

TECHNICAL FIELD

The present invention relates to material level sensors to gauge the level of material in containers and, more particularly, to a continuous level sensor that consists of an ultrasonic sensor and a capacitive proximity sensor wherein the capacitive proximity sensor shuts off the continuous ultrasonic sensor when the material being detected is within the dead zone area of detection of the ultrasonic sensor.

BACKGROUND ART

Numerous continuous level sensors have been devised to detect the level of liquid or solid particulate matter in bins or silos. Mechanical or electromechanical devices can be useful in liquids but are not reliable when dealing with particulate solids such as powders, grains, feed, and the like. Other sensors include ultrasonic, radar, and time, domain reflectometry. The ultrasonic sensor is popular because of its relative accuracy and simplicity of operation. The ultrasonic sensor is located at or near the top of a container and transmits ultrasonic energy through the air to the material surface. The time measured between the transmission and return of the ultrasonic energy is used to compute the distance from the sensor to the material level.

Ultrasonic sensors use a piezo-crystal which vibrates or "rings" to emit ultrasonic energy. Reflected ultrasound cannot be accurately measured until the piezo-crystal stops vibrating. Hence, ultrasonic sensors have a "dead zone" near the sensor where distance cannot be measured accurately. In addition, the ultrasonic sensor may indicate a false level under these conditions. In bins or silos where accurate estimates of material levels are essential to monitor inventory and/or consumption, ultrasonic sensors are not useful. For example, in bins or silos that are 12 to 30 feet in height, a single ultrasonic sensor would not be useful because the ultrasonic sensor could give a reading of any level if the material level is in the dead zone of the ultrasonic sensor. Also, ultrasonic sensors need to avoid contact with the material in the container in order to prevent contamination and malfunction.

One approach to solve this problem is the use of a second ultrasonic sensor which is a point level sensor for the detection of liquid. When the liquid level reaches a certain height the point level ultrasonic sensor provides a warning. However, the ultrasonic point level sensor has its own dead zone and is susceptible to producing erroneous readings and to potential contamination and malfunction. In addition, the use of combined ultrasonic sensors may be expensive, and there is no evidence that this combination is useful with non-liquid materials. What is needed, therefore, is an ultrasonic sensor system using a single continuous ultrasonic sensor, wherein the ultrasonic sensor dead zone can be accurately detected.

DISCLOSURE OF THE INVENTION

The present invention is a material level sensing device for a bin or silo. The sensing device combines a continuous ultrasonic sensor with a capacitive proximity sensor. The capacitive proximity sensor is positioned proximate the limit of the dead zone of the ultrasonic sensor. When material reaches the detection level of the capacitive proximity sensor the signal from the ultrasonic sensor is shut off and replaced by a signal from the capacitive proximity sensor. When the material level falls below the detection level of the capacitive proximity sensor, the signal from the capacitive proximity sensor is shut off and replaced by the signal from the ultrasonic sensor. Because no signal is ever transmitted from the ultrasonic sensor when the material in the container is proximate or within the dead zone of the ultrasonic sensor, the signals from the ultrasonic sensor are accurate and reliable. Since only one signal is transmitted from the sensing device, the acquisition and processing of data from the device is simple, rapid, and inexpensive.

An advantage of the present invention is a continuous ultrasonic level detector that is accurate and reliable.

Another advantage is the use of an inexpensive and durable capacitive proximity sensor to detect material levels proximate or within the dead zone of the ultrasonic sensor.

Another advantage is a material level sensor that provides a single accurate level detection output signal.

Another advantage is a material level sensor that fits reversibly at the top of a silo or bin.

Another advantage is a material level sensor that can use a capacitive proximity sensor that can be customized to meet the requirements of any type of ultrasonic sensor and type of silo or bin.

Another advantage is a material level sensor that is simple and inexpensive to manufacture.

BEST MODE FOR CARRYING OUT THE INVENTION

While the following description details the preferred embodiments of the present invention, it is to be understood that the invention is not limited in its application to the details of construction and arrangement of the parts illustrated in the accompanying drawings, since the invention is capable of other embodiments and of being practiced in various ways.

Figure 1:
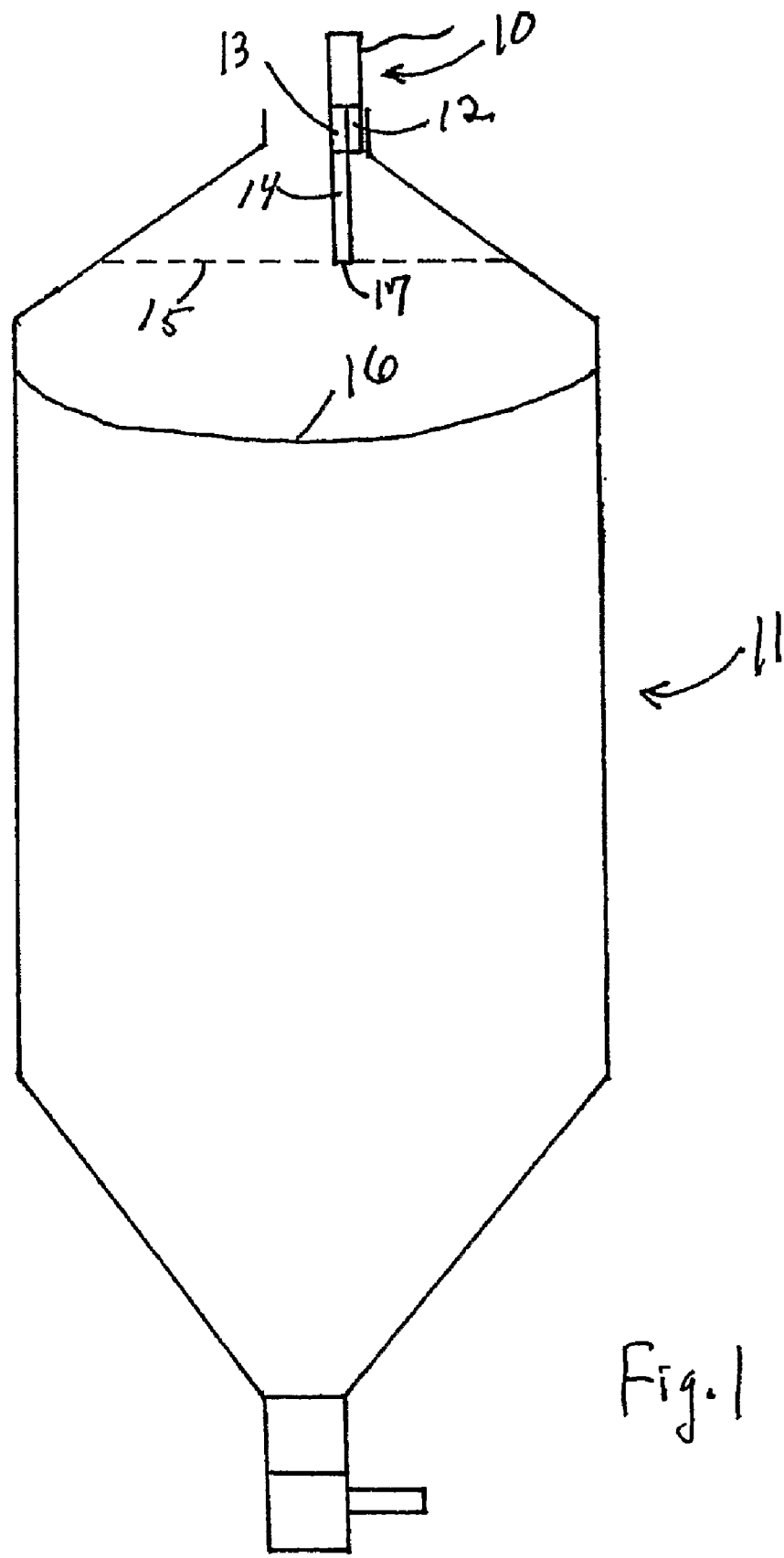
FIG. 1 illustrates the material level sensor of the present invention in position in a feed silo.

FIG. 1 shows the material level sensor 10 of the present invention in place at the top of a feed silo 11. Material level sensor 10 has a continuous ultrasonic sensor 12 and a capacitive proximity sensor 13. Capacitive proximity sensor 13 has a detecting rod 14 which extends downward to or beyond the limit of the dead zone 15 of ultrasonic sensor 12. Ultrasonic sensor 12 detects the level of feed material 16 in silo 11, and capacitive proximity sensor 13 detects the level at the tip 17 of rod 14, which may be, for example, at or just beyond the limit of the dead zone 14 of the ultrasonic sensor 12.

A capacitor consists of two plates separated by a dielectric material. In a capacitive proximity sensor, the detecting plate is in the sensor and the other plate can be the earth or ground. In the present invention, rod 14 is the detecting plate. As material in silo 11 fills the space between the bottom of silo 11 and the tip 17 of rod 14 the capacitance of capacitive proximity sensor 13 changes. This change in capacitance is detectable as the material in silo 11 gets close to tip 17. In the present invention, the level of material 16 can be detected accurately within 0.25 inches as it approaches tip 17. The dimensions of silo 11 and the length of rod 14 are known. By using methods well known in the art it is, therefore, possible to calculate the height or level of material 16 using the level detection signal of ultrasonic sensor 12, and to determine when the level of material 16 has reached or entered the dead zone limit 15 using the level detection signal of capacitive proximity sensor 13.

Figure 2:
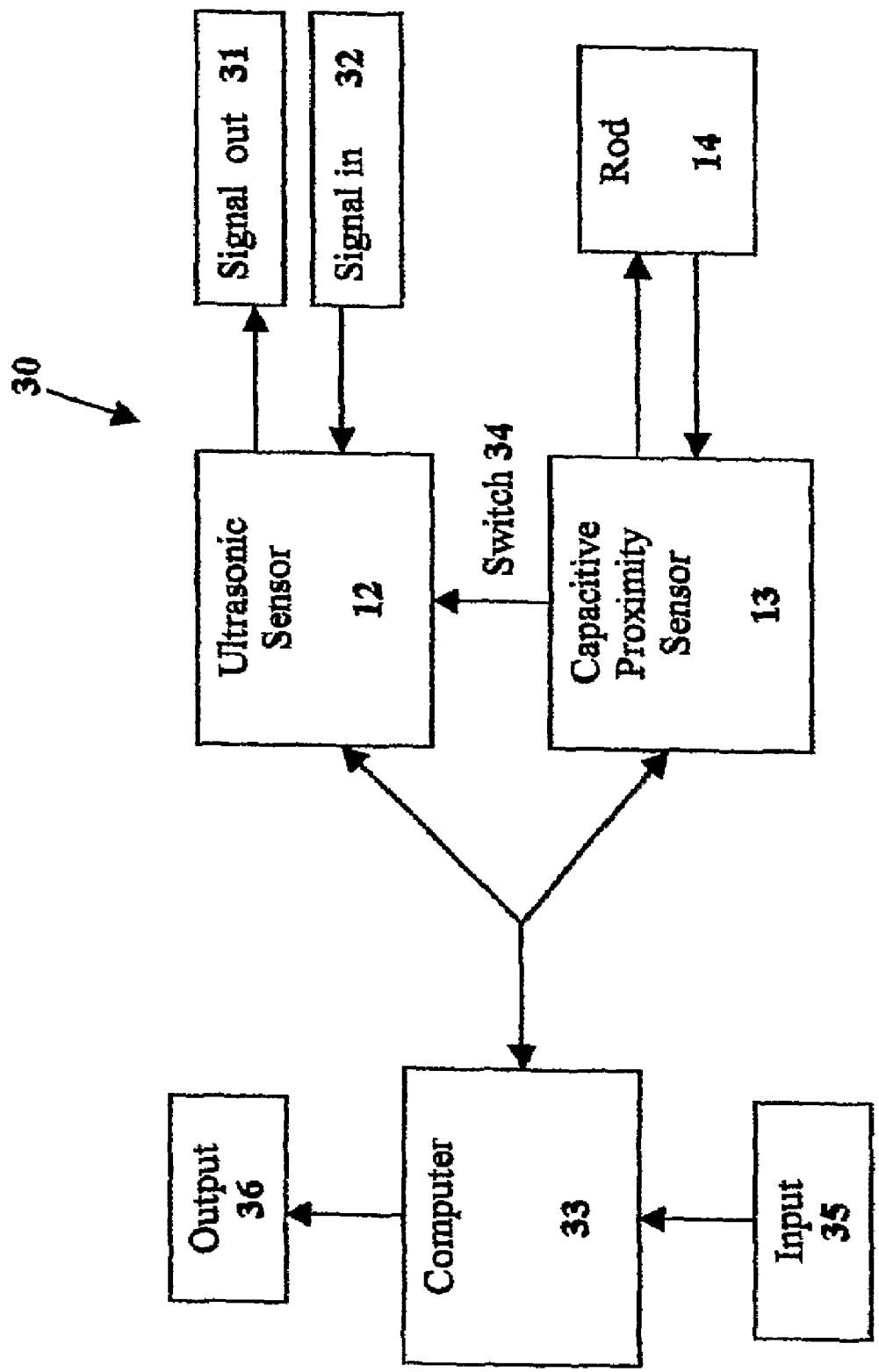
FIG. 2 shows the material level sensing system of the present invention.

The material level sensing system 30 of the present invention is shown in FIG. 2. Ultrasonic sensor 12 emits an ultrasonic signal 31 which is reflected off the surface of material in the container. The reflected signal is detected as an input signal 32 by ultrasonic sensor 12. The time measured between the transmission and return of the ultrasonic energy is used to compute the distance from the ultrasonic sensor 12 to the level of material. The theory and mode of operation is disclosed in detail in U.S. Pat. No. 6,832,516 which is incorporated herein by reference.

Capacitive proximity sensor 13 detects changes in capacitance at tip 17 of rod 14 as material in the silo comes into proximity of tip 17. In a silo having a depth of 12 to 30 feet, a suitable ultrasonic sensor would have a dead zone of about 8 inches. Thus, rod 14 may extend about 10 inches below ultrasonic sensor 12 as illustrated in FIG. 1. The sensitivity of capacitive proximity sensor can be adjusted so that detection of the material level can occur within about a 24 inch range with an accuracy of 0.25 inches. Capacitive proximity sensor 13 and ultrasonic sensor 12 can send level detection signals to a computer 33 for processing, storage, and reporting.

Capacitive proximity sensor 13 does not send a level detection signal to computer 33 until it detects material at or near the tip 17 of rod 14. As long as capacitive proximity sensor 13 does not detect material, ultrasonic sensor 12 sends a level detection signal to computer 33. As soon as capacitive proximity sensor 13 detects material at or near the tip 17 of rod 14, capacitive proximity sensor 13 activates a switch 34 which grounds ultrasonic sensor 12 and prevents further transmission of a level detection signal from ultrasonic sensor 12 to computer 33. At this point, capacitive proximity sensor 13 sends a level detection signal to computer 33. When capacitive proximity sensor 13 no longer detects material, then switch 34 is turned off and ultrasonic sensor 12 resumes transmission of the level detection signal to computer 33. This arrangement insures that only a single level detection signal is sent to computer 33 at any given time, and that ultrasonic sensor 12 cannot transmit level detection signals to computer 33 when the material is near or within the limit of the dead zone of ultrasonic sensor 12. The electronic characteristics of the level detection signals coming from the capacitive proximity sensor are made distinguishable from those coming from the ultrasonic sensor so that the computer can identify which sensor is transmitting the level detection signal.

The computer 33 has a microprocessor, memory, and data storage and retrieval functions characteristic of conventional computers used in the art. The computer is programmable by standard methods, and has input 35 and output 36 capabilities suitable for retrieving, storing and transmitting data. Some input capabilities include, for example, keyboards, telephone lines, radio frequency receivers, audio input, video input, internet communication, scanners, and cable input. Some output capabilities include, for example, audio, visual, telephone, cable, internet, and radio-frequency transmission. The output 36 of computer 33 can provide real-time monitoring of signal detection, generate reports on material inventory and on material consumption, or can send instructions to other instruments or machines to perform certain functions related to material level.

Figure 3:
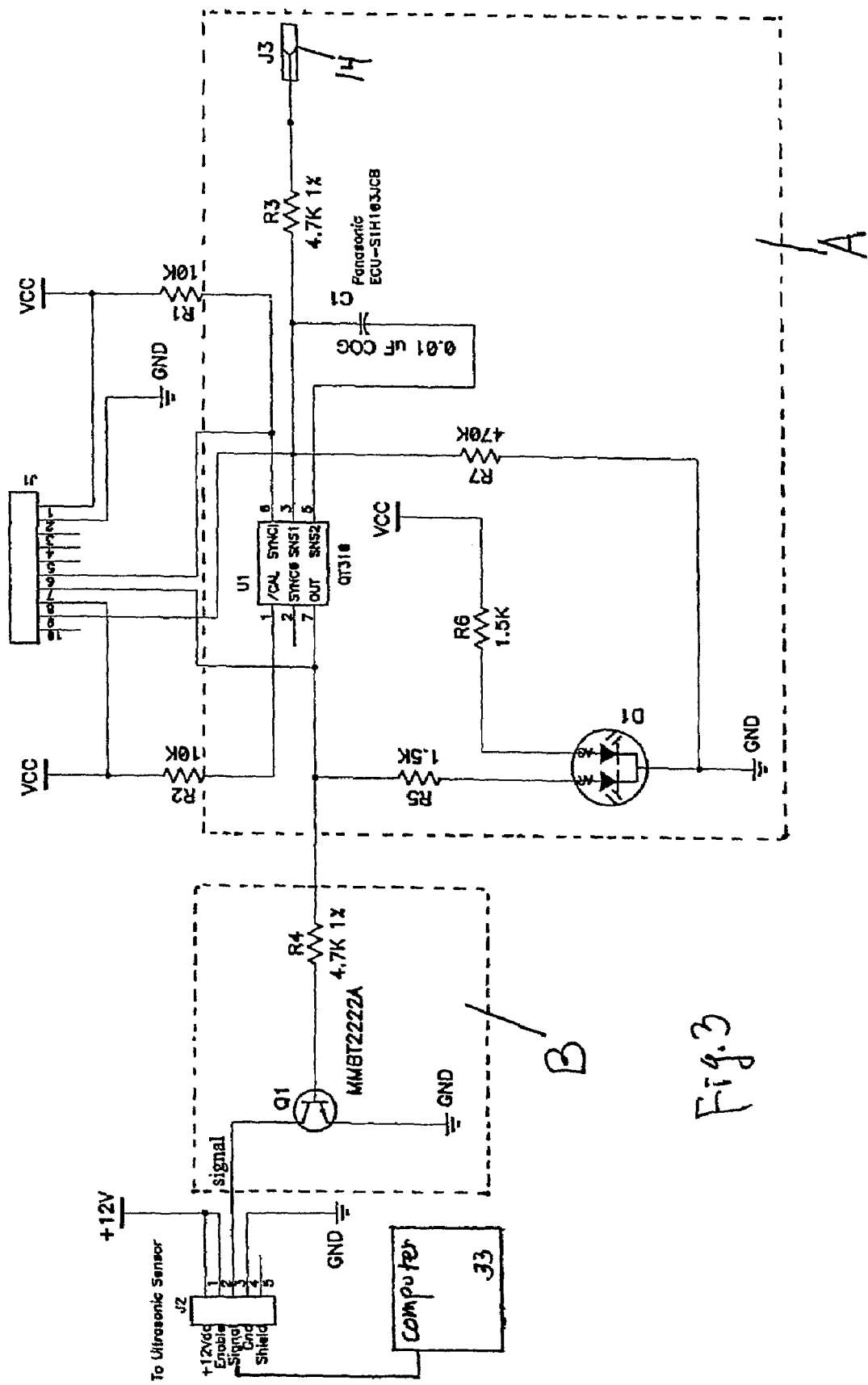
FIG. 3 is a schematic of the capacitive proximity sensor of the present invention.

FIG. 3 shows a schematic of the capacitive proximity sensor of the present invention. The details of capacitive proximity sensor 13 are shown in Frame A and the details of switch 34 are shown in Frame B. Switch 34 is, preferably, a digital switch. Switch 34 can regulate ultrasonic sensor 12 directly or through computer 33.

The combined capacitive proximity sensor and ultrasonic sensor of the present invention is particularly useful in feed silos or bins, such as, for example, poultry feed silos, to monitor feed inventory and consumption. The sensor is easily attached to the top part of the feed silo. In a silo with a conical top as shown in FIG. 1, the dead zone volume would be quite small, less than 5% of total bin capacity. Errors related to not measuring dead zone feed levels would be negligible relative to total silo capacity.

Capacitive proximity sensors used in the present invention are relatively simple to construct so that they can be customized to operate with any type of ultrasonic sensor and any size bin or silo, with any level of depth, position or desired sensitivity. They are rugged, durable, and inexpensive to replace. The feature of a single level detection output signal makes the acquisition, storage, processing, and reporting of material level data relatively simple.

The foregoing description has been limited to specific embodiments of this invention. It will be apparent, however, that variations and modifications may be made by those skilled in the art to the disclosed embodiments of the invention, with the attainment of some or all of its advantages and without departing from the spirit and scope of the present invention. For example, any commercially available ultrasonic sensor or capacitive proximity sensor can be used. The combination level detection sensor of the present invention can be used to measure levels of liquids as well as solid particulates. The combination level detection sensor can be used to activate alarms or to operate silo-filling equipment. A temperature sensor can be integrated into the combination level detection sensor to produce a signal to provide correction for the velocity of the ultrasonic energy in the air of the container.

It will be understood that various changes in the details, materials, and arrangements of the parts which have been described and illustrated above in order to explain the nature of this invention may be made by those skilled in the art without departing from the principle and scope of the invention as recited in the following claims.

The invention claimed is:

1. A device (10) for sensing the level of material (16) in a container (11), comprising:
   a) a continuous ultrasonic sensor (12); and
   b) a capacitive proximity sensor (13);
   c) wherein said capacitive proximity sensor is positioned to detect the material only at a level proximate or within the limit of a dead zone (15) of said ultrasonic sensor and said ultrasonic sensor provides a level detection signal only when said capacitive proximity sensor does not detect the material.

2. The device of claim 1 wherein said capacitive proximity sensor provides a level detection signal only when said capacitive proximity sensor detects the material.

3. The device of claim 1 further comprising a switch (34) that is activated when said capacitive proximity sensor detects the material, said switch preventing said ultrasonic sensor from providing a level detection signal when said switch is activated.

4. The device of claim 1 wherein said capacitive proximity sensor has a rod (14) to detect the material only at a level proximate or within the limit of the dead zone of said ultrasonic sensor.

5. The device of claim 1 wherein said device produces a single level detection signal.

6. The device of claim 1 wherein the material is non-liquid.

7. The device of claim 1 wherein the material is liquid.

8. A device (10) for sensing the level of material (16) in a container (11), comprising:
   a) a continuous ultrasonic sensor (12) and a capacitive proximity sensor (13);
   b) wherein said capacitive proximity sensor has a rod (14) to detect the material only at a level proximate or within the limit of a dead zone (15) of said ultrasonic sensor;
   c) wherein said ultrasonic sensor provides a level detection signal only when said capacitive proximity sensor does not detect the material;
   d) wherein said capacitive proximity sensor provides a level detection signal only when said capacitive proximity sensor detects the material;
   e) a switch (34) that is activated when said capacitive proximity sensor detects the material, said switch preventing said ultrasonic sensor from providing a level detection signal when said switch is activated; and
   f) wherein said device produces a single level detection signal.

9. A method (30) for sensing the level of material (16) in a container (11), comprising the steps of:
   a) detecting said material level continuously with a first sensor (12) until said material level reaches a dead zone (15) of said first sensor, said first sensor providing a level detection signal;
   b) detecting when said material level reaches said dead zone with a second sensor (13); and
   c) switching off the level detection signal of said first sensor when said second sensor detects said material level reaches said dead zone.

10. The method of claim 9, further comprising the step of providing a level detection signal from said second sensor only when said second sensor detects said material.

11. The method of claim 9, further comprising the step of producing a single level detection signal.

12. The method of claim 9 wherein said material is non-liquid.

13. The method of claim 9 wherein said material is liquid.

14. The method of claim 9 wherein said first sensor is a continuous ultrasonic sensor and said second sensor is a capacitive proximity sensor.

15. A method (30) for sensing the level of material (16) in a container (11), comprising the steps of:
   a) detecting said material level continuously with a continuous ultrasonic sensor (12) until said material level reaches a dead zone (15) of said ultrasonic sensor, said ultrasonic sensor providing a level detection signal;
   b) detecting when said material level reaches said dead zone with a capacitive proximity sensor (13);
   c) switching off the level detection signal of said ultrasonic sensor when said capacitive proximity sensor detects said material level reaching said dead zone;
   d) providing a level detection signal from said capacitive proximity sensor only when said capacitive proximity sensor detects said material; and
   e) producing a single level detection signal from said device.

* * * * *